United States Patent
Dees et al.

(10) Patent No.: US 10,721,622 B2
(45) Date of Patent: Jul. 21, 2020

(54) WIRELESS COMMUNICATION SYSTEM WITH MULTIPLE SECURITY LEVELS

(71) Applicant: KONINKLIJKE PHILIPS N.V., Eindhoven (NL)

(72) Inventors: Walter Dees, Eindhoven (NL); Franciscus Antonius Maria Van De Laar, Veldhoven (NL); Johannes Arnoldus Cornelis Bernsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 198 days.

(21) Appl. No.: 16/064,166

(22) PCT Filed: Dec. 21, 2016

(86) PCT No.: PCT/EP2016/082047
§ 371 (c)(1),
(2) Date: Jun. 20, 2018

(87) PCT Pub. No.: WO2017/114702
PCT Pub. Date: Jul. 6, 2017

(65) Prior Publication Data
US 2019/0014469 A1    Jan. 10, 2019

(30) Foreign Application Priority Data
Dec. 31, 2015  (EP) ..................... 15203273

(51) Int. Cl.
*H04W 12/06* (2009.01)
*H04W 76/14* (2018.01)
(Continued)

(52) U.S. Cl.
CPC ........... *H04W 12/06* (2013.01); *H04L 63/162* (2013.01); *H04W 8/005* (2013.01);
(Continued)

(58) Field of Classification Search
CPC ... H04W 12/06; H04W 76/14; H04W 12/003; H04W 8/005; H04W 12/02; H04W 12/08; H04L 63/162
See application file for complete search history.

(56) References Cited

U.S. PATENT DOCUMENTS 6,584,567 B1   6/2003   Bellwood
9,992,680 B2   6/2018   Liu
(Continued)

FOREIGN PATENT DOCUMENTS

JP   2007181123 A   7/2007
WO   WO2015092971 A1   6/2015

OTHER PUBLICATIONS

Camps-Mur, et al., "Device to device communications with WiFi Direct: overview and experimentation", (Jan. 11, 2013); http://en j ambre. it.uc3m.es/"agsaaved/papers/2012_camps_wi rcommag.pdf.
(Continued)

*Primary Examiner* — Oleg Korsak

(57) ABSTRACT

A secure wireless communication system has a communication device acting as a service seeker (210) and a further communication device acting as a service provider (220) according to a security protocol defining link layer security according to a security mechanism. The service provider enables a first service requiring a link layer security according to a first security mechanism. The devices establish a first secure link connection 5 (241) to engage the first service. The service provider determines that a further service requires a link layer security according to a second security mechanism different from the first security mechanism. The devices now establish a second secure link connection (242) on the link layer according to the second security mechanism while the first secure link connection remains active to engage the further service via the second secure link connection, 10 while blocking the service seeker (Continued)

from accessing the further service until the second secure link connection has been established.

15 Claims, 6 Drawing Sheets

(51) Int. Cl.
    *H04L 29/06*     (2006.01)
    *H04W 12/02*     (2009.01)
    *H04W 8/00*     (2009.01)
    *H04W 12/00*     (2009.01)
    *H04W 12/08*     (2009.01)

(52) U.S. Cl.
    CPC ......... *H04W 12/003* (2019.01); *H04W 12/02* (2013.01); *H04W 12/08* (2013.01); *H04W 76/14* (2018.02)

(56) References Cited

U.S. PATENT DOCUMENTS

| | | | | |
|---|---|---|---|---|
| 10,122,801 B2* | 11/2018 | Kafle | ................... | H04L 65/608 |
| 2011/0149806 A1* | 6/2011 | Verma | ................. | H04L 12/2809 |
| | | | | 370/255 |
| 2012/0155643 A1* | 6/2012 | Hassan | ................. | H04L 63/065 |
| | | | | 380/270 |
| 2013/0111041 A1 | 5/2013 | Madhusudan | | |
| 2014/0126470 A1* | 5/2014 | Qi | ........................ | H04W 76/18 |
| | | | | 370/328 |
| 2014/0337544 A1* | 11/2014 | Huang | ................. | G06F 13/385 |
| | | | | 710/63 |
| 2014/0351445 A1* | 11/2014 | Davidson | .............. | H04W 8/005 |
| | | | | 709/227 |
| 2014/0355585 A1* | 12/2014 | Sadeghi | ................ | H04W 76/14 |
| | | | | 370/338 |
| 2015/0373765 A1 | 12/2015 | Lee | | |
| 2017/0237818 A1* | 8/2017 | Fang | ..................... | H04L 67/141 |
| | | | | 709/227 |

OTHER PUBLICATIONS

Daemen, et al., "AES Proposal: Rijndael" (Mar. 9, 2003) http://csrc.nist.gov/archive/aes/rijndael/Rijndael-ammended.pdf.

FIPS Pub 140-2; Federal Information Processing Standards Publication; (Jan. 11, 1994) http://csrc.nist.gov/publications/fips/fips140-2/fips1402.pdf.

Data Encryption Standard (DES); Federal Information Processing Standards Publication (Oct. 25, 1999) http://csrc.nist.gov/publications/fips/fips46-3/fips46-3.pdf.

Rivest, et al., "A Method for Obtaining Digital Signatures and Public-Key Cryptosystems"; Communications of the ACM 21 (2): 120-126; (Feb. 1978).

RC4 Description; Wikipedia, 1987 https://en.wikipedia.org/wiki/RC4.

Secure Hash Standard (SHS); FIPS Pub 180-4 (Mar. 2012) http://csrc.nist.gov/publications/fips/fips180-4/fips-180-4.pdf.

IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2012), Mar. 2012, Revised 2016.

* cited by examiner

WIRELESS COMMUNICATION SYSTEM WITH MULTIPLE SECURITY LEVELS

FIELD OF THE INVENTION

The invention relates to a communication device for use in a secure wireless communication system comprising the communication device and a further communication device. The communication device comprises a security processor and a wireless transceiver arranged to establish secure interaction between the communication device and the further communication device according to a security protocol, the security protocol defining a link layer security according to a security mechanism. The invention further relates to a service seeker method and a service provider method for use in the secure wireless communication system, and a computer program product for use in the device.

The present invention relates generally to the field of securely providing services via a wireless connection, one communication device being arranged to act as a service seeker and another communication device being arranged to act as a service provider. The service provider may advertise the services via a wireless advertisement message, and may be called a service advertiser.

BACKGROUND OF THE INVENTION

Several new wireless technologies, such as Wi-Fi extensions Wi-Fi Direct services (see ref[1]), Application Service Platform (ASP), Wi-Fi Aware, and IEEE 802.11aq, or other wireless communication systems such as Bluetooth or Zigbee, offer mechanisms for devices to advertise and seek services that are made accessible through Wi-Fi. In this document the words providing services are used for the general concept of a device offering and making available a function, service or application to be used by another device. Thereto service providing devices, called service providers, can use beacons and management frames to advertise services in service advertising messages including information about available services. Devices seeking such a service, called service seekers, may receive a service advertising message and perform service discovery to get additional information about the services, such as the service name, advertisement ID, service specific information. Devices advertising services may provide information about which Wi-Fi Protected Setup (WPS) configuration method are supported by the device, for example in basic Wi-Fi P2P. This may also be done per service. If a service seeker has found an interesting service to connect to, the discovered information can be used by a service seeker to set up a connection with the respective service provider and start using the discovered service.

In order to set up a connection between the service seeker and the service provider, the service seeker has to perform an authentication step with the service provider, for example using one of the Wi-Fi Protected Setup configuration methods, such as Push button, entering PIN code, NFC, or using WFDS Default configuration method using a fixed PIN, or using for example 802.1x RADIUS authentication. The authentication step may result in a shared key for use in the link protection (link encryption and integrity protection) and the selection of a security protocol and cryptographic algorithm sets. Examples of security protocols are WPA2-Personal, WPA-Enterprise, WEP.

Wired Equivalent Privacy (WEP) is a security algorithm for IEEE 802.11 wireless networks. Introduced as part of the original 802.11 standard ratified in 1997, its intention was to provide data confidentiality comparable to that of a traditional wired network.

WPA-Personal is also referred to as WPA-PSK (pre-shared key) mode, this is designed for home and small office networks and doesn't require an authentication server. Each wireless network device encrypts the network traffic using a 256 bit key. This key may be entered either as a string of 64 hexadecimal digits, or as a passphrase of 8 to 63 printable ASCII characters. If ASCII characters are used, the 256 bit key is calculated by applying a key derivation function to the passphrase. WPA-Personal mode is available with both WPA and WPA2.

WPA-Enterprise is also referred to as WPA-802.1X mode, and sometimes just WPA (as opposed to WPA-PSK), this is designed for enterprise networks and requires a RADIUS authentication server. This requires a more complicated setup, but provides additional security (e.g. protection against dictionary attacks on short passwords). Various kinds of the Extensible Authentication Protocol (EAP) are used for authentication. WPA-Enterprise mode is available with both WPA and WPA2.

WPA (sometimes referred to as the draft IEEE 802.11i standard) became available in 2003. The Wi-Fi Alliance intended it as an intermediate measure in anticipation of the availability of the more secure and complex WPA2. WPA2 became available in 2004 and is common shorthand for the full IEEE 802.11i (or IEEE 802.11i-2004) standard. IEEE 802.11i-2004 has been incorporated into IEEE 802.11 (2012) (see ref [2]).

Examples of cryptographic operations are AES, DES, 3DES, RC4, RSA, ECC (for encryption), HMAC_SHA256 (keyed hash function for integrity protection), and MD5, SHA1, SHA2 (hash functions).

AES is based on the Rijndael cipher developed by Joan Daemen and Vincent Rijmen, who submitted a proposal to NIST during the AES selection process. Rijndael is a family of ciphers with different key and block sizes, as described in "Daemen, Joan; Rijmen, Vincent: AES Proposal (Mar. 9, 2003)", available from http://csrc.nist.gov/archive/aes/rijndael/Rijndael-ammended.pdf.

DES was approved as a US federal standard in November 1976, and published on 15 Jan. 1977 as FIPS PUB 46, authorized for use on all unclassified data. It was subsequently reaffirmed as the standard in 1983, 1988 (revised as FIPS-46-1), 1993 (FIPS-46-2, http://csrc.nist.gov/publications/fips/fips140-2/fips1402.pdf), and again in 1999 (FIPS-46-3, http://csrc.nist.gov/publications/fips/fips46-3/fips46-3.pdf), the latter prescribing "Triple DES" also called 3DES.

Encryption/decryption, asymmetric key RSA is one of the first practical public-key cryptosystems and is widely used for secure data transmission. In such a cryptosystem, the encryption key is public and differs from the decryption key which is kept secret. In RSA, this asymmetry is based on the practical difficulty of factoring the product of two large prime numbers, the factoring problem. RSA is made of the initial letters of the surnames of Ron Rivest, Adi Shamir, and Leonard Adleman. Rivest, R.; Shamir, A.; Adleman, L. (February 1978). "A Method for Obtaining Digital Signatures and Public-Key Cryptosystems" (PDF). Communications of the ACM 21 (2): 120-126.

RC4 stands for "Rivest Cipher 4" and was designed by Ron Rivest of RSA Security in 1987. RC4 was initially a trade secret. A description can be found on https://en.wikipedia.org/wiki/RC4

Elliptic curve cryptography (ECC) is an approach to public-key cryptography based on the algebraic structure of elliptic curves over finite fields. ECC requires smaller keys compared to non-ECC cryptography (based on plain Galois fields) to provide equivalent security. Elliptic curves are applicable for encryption, digital signatures, pseudo-random generators and other tasks. See e.g. NIST, Recommended Elliptic Curves for Government Use.

Keyed hash functions for integrity protection include HMAC-SHA256. HMAC-SHA256 is a keyed-hash message authentication code (HMAC) that uses SHA256 as the cryptographic hash function. An HMAC is a specific construction for calculating a message authentication code (MAUC) involving a cryptographic hash function in combination with a secret cryptographic key. As with any MAUC, it may be used to simultaneously verify both the data integrity and the authentication of a message. HMAC can be used with any of the following cryptographic hash functions.

A key aspect of cryptographic hash functions is their collision resistance: nobody should be able to find two different input values that result in the same hash output. By comparing the computed "hash" (the output from execution of the algorithm) to a known and expected hash value, a person can determine the data's integrity. Example are the following.

The MD5 message-digest algorithm is a cryptographic hash function producing a 128-bit hash value. MD5 has been utilized in a wide variety of cryptographic applications, and is also commonly used to verify data integrity. MD5 was designed by Ronald Rivest in 1991 and is described in RFC 1321.

SHA-1 (Secure Hash Algorithm 1) is a cryptographic hash function designed by the United States National Security Agency and is a U.S. Federal Information Processing Standard published by the United States NIST, see http://csrc.nist.gov/publications/fips/fips180-4/fips-180-4.pdf.

SHA-2 (Secure Hash Algorithm 2) is a set of cryptographic hash functions designed by the NSA. SHA stands for Secure Hash Algorithm. The SHA-2 family consists of six hash functions with digests (hash values) that are 224, 256, 384 or 512 bits: SHA-224, SHA-256, SHA-384, SHA-512, SHA-512/224, SHA-512/256, see http://www.staff.science.uu.nl/~werkh108/docs/study/Y5_07_08/infocry/project/Cryp08.pdf.

Usually, a set of cryptographic operations is used in a security protocol. Once the authentication and security protocol are completed, the service seeker and service provider are successfully connected through Wi-Fi. The sequence of steps to arrive at this connected state is called a security mechanism. After execution of the applicable security mechanism the higher layer communication can be initiated between the seeker and service provider to start using the services offered by the service provider, i.e. using application layer protocols on top of the MAC.

Once the service seeker and service provider are connected via a link layer connection, e.g. using Wi-Fi, the service seeker may not only be able to access the initial service of the service provider to which the seeker wanted to use, it may also try to access other services on the service provider through any application layer protocol. The service provider may however block such other services. For example, the service provider may have some firewall to block certain types of traffic or block access to specific IP ports. For example in Wi-Fi Direct services, ports are blocked until the service seeker requests a session with a particular service by sending an ASP REQUEST_SESSION message. However, firewalls usually block communication based on the type of application and/or protocol, or block based on certain IP address ranges as source or destination of the communication.

US2015/0373765 describes wireless communication and providing an application service platform (ASP) via WiFi Direct. On the ASP layer multiple services may be engaged, while a single P2P connection is established on Wi-Fi Direct level.

US2013/0111041 describes establishing a wireless connection between mobile devices. Security protocols may be applied when transmitting user information. After exchange of user information, the devices may establish a direct data-link. The direct data-link enables the devise to transmit data without associating to a network and perform authentication protocols or higher level security frames, and may co-exist with an existing connection to a network.

Document "Daniel Camps-Mur ET AL: "Device to device communications with Wi-Fi Direct: overview and experimentation, XP055101759" describes the Wi-Fi Direct extension of the Wi-Fi standard. Security is discussed, and refers to various well-known security protocols for Wi-Fi Protected Setup (WPS).

SUMMARY OF THE INVENTION

A problem of the above systems is that each authentication method and each security protocol and cryptographic algorithm set provides a different level of security. Some security mechanisms only provide link protection, but no man-in-the-middle protection. Some security mechanisms are suitable only for personal use, whereas others are suitable for enterprise users requiring much higher levels of protection, etc. Some services require more security than others, and hence may need some additional security or authentication measures.

It is an object of the invention to provide a system for conveniently enabling multiple services requiring multiple security levels in a wireless connectivity system.

For this purpose devices and methods are provided as defined in the appended claims.

There is provided a communication device for secure wireless communication with a further communication device. The communication device comprises a security processor and a wireless transceiver arranged to establish secure interaction between the communication device and the further communication device according to a security protocol, the security protocol defining a link layer security according to a security mechanism. The communication device is arranged to act as a service seeker while the further communication device acts as a service provider. Alternatively, or additionally, the communication device is arranged to act as a service provider while the further communication device acts as a service seeker. The security processor of the communication device acting as service provider arranged to enable at least a first service, the first service requiring a link layer security according to a first security mechanism, establish a first secure link connection with the service seeker on a link layer according to the first security mechanism, and engage the first service via the first secure link connection. The security processor of the communication device acting as service seeker arranged to detect a first service as provided by the service provider, establish a first secure link connection with the service provider on a link layer according to the first security mechanism, and engage the first service via the first secure link connection. The security processor of the communication device acting as service provider further arranged to enable a further service, determine that the further service requires a link layer security according to a second security mechanism different from the first security mechanism, establish a second secure link connection with the service seeker on the link layer according to the second security mechanism while the first secure link connection remains active, engage the further service via the second secure link connection, and block the service seeker from accessing the further service until the second secure link connection has been established. The security processor of the communication device acting as service seeker further arranged to detect that the further service requires a link layer security according to a second security mechanism different from the first security mechanism, establish a second secure link connection with the service provider on the link layer according to the second security mechanism while the first secure link connection remains active, and engage the further service via the second secure link connection.

There is also provided a service seeker method for the above secure wireless communication. The method when executing in the security processor has the communication device act as a service seeker, while the further communication device acts as a service provider. The service seeker method comprises detecting a first service as provided by the service provider, establishing a first secure link connection with the service provider on a link layer according to the first security mechanism, and engaging the first service via the first secure link connection. The service seeker method further comprises detecting that the further service requires a link layer security according to a second security mechanism different from the first security mechanism, establishing a second secure link connection with the service provider on the link layer according to the second security mechanism while the first secure link connection remains active, and engaging the further service via the second secure link connection.

There is also provided a service provider method for the above secure wireless communication. The method when executing in the security processor has the communication device act as a service provider, while the further communication device acts as a service seeker. The service provider method comprises enabling at least a first service, the first service requiring a link layer security according to a first security mechanism, establishing a first secure link connection with the service seeker on a link layer according to the first security mechanism, and engaging the first service via the first secure link connection. The service provider method further comprises enabling a further service, determining that the further service requires a link layer security according to a second security mechanism different from the first security mechanism, establishing a second secure link connection with the service seeker on the link layer according to the second security mechanism while the first secure link connection remains active, engaging the further service via the second secure link connection, and blocking the service seeker from accessing the further service until the second secure link connection has been established.

The above features have the effect that when a communication device is using a first service via a secure link, that selecting and using a further service is enabled even if the further service has a different security requirement at the link layer. Thereto the different security requirement is determined, in particular by determining that the further service requires a link layer security according to a second security mechanism different from the first security mechanism. For example, the service seeker and/or provider may obtain predefined data or security parameters regarding the link layer security of the respective security mechanisms, or may use a predefined lookup table. It is noted that various possible security protocols may differ also, or only, on higher communication layers in the communication protocol stack according to the OSI networking model as commonly used to structure data communication. In this respect higher layers are above the link layer that directly connects the communication devices, for example higher layers like the application layer, service layer or session layer. Security differences of such higher layers are not relevant here. The differences between security mechanisms determined here involve different security measures, key material, security credentials, etc. at the link layer. In the event the different security requirement is detected, a second link layer connection is set up using the second security mechanism. Accessing the further service via the first link connection is blocked until a second link connection has been set up. Moreover, by establishing a second secure link connection and engaging the further service via that connection, the use of the first service need not be terminated or interrupted. Advantageously, the use of the first service is not affected by engaging the second service. Also advantageously, setting up of a second link layer connection appears to require only limited additional resources in the communication device. For example, a control unit that is already equipped to set up a first secure link layer connection only needs a few additional elements to set up a further connection, because much of the control functions, e.g. implemented in state machines, can be re-used.

The invention is inter alia based on the following recognition. Firewalls and applications/services running on a device are typically unaware of the particular authentication method and security method that was used to set up the underlying MAC layer connection. Hence a new service or application cannot be allowed to securely rely on existing secure link layer connections. Also, a service/application level authorization step could be required to set up e.g. TLS encrypted payload connection or VPN tunneling connection on top of an unencrypted MAC/IP transport layer. However, this would require additional user interaction steps for each application/service, additional complexity to build such functionality into each of the wireless applications/services, which is inconvenient for the user. Also more resources may be required, because underlying wireless security/encryption methods may be built into hardware, whereas the upper layer security layers are typically in software. Based thereon the inventors have seen that setting up a second link layer connection via a different, second security mechanism, while maintaining the existing first layer connection active obviates these problems.

Optionally in the above communication device, the first security mechanism comprises a first authentication protocol and the second security mechanism comprises a second authentication protocol different from the first authentication protocol; or the first security mechanism comprises a first set of cryptographic operations and the second security mechanism comprises a second set of cryptographic operations different from the first set of cryptographic operations. Advantageously the device supports different authentication protocols and/or sets of cryptographic operations for engaging respective different services.

Optionally in the above communication device, the secure link connection on the link layer is an authenticated and secure MAC transport layer connection using a first seeker MAC address and a first provider MAC address, and the security processor is arranged to establish the second secure link connection using a second seeker MAC address and a second provider MAC address, the second seeker MAC address being different from the first seeker MAC address and the second provider MAC address being different from the first provider MAC address. Advantageously, by using respective different MAC addresses, setting up separated link layer connections is effectively achieved.

Optionally the security processor comprises a security management unit arranged to operate at a communication management layer above the link layer and to determine that the further service requires a link layer security according to the second security mechanism different from the first security mechanism by
  determining a hierarchy or classification of different security mechanisms,
  acquiring, from the link layer below the communication management layer, first security data identifying the security mechanism of the first secure link connection,
  establishing based on the first security data whether the further service requires a different security mechanism. The security management unit is operationally active in the higher network application layers and may control the selection and activation of respective services. Due to being operational at such a higher layer, details of the lower layers such as the link layer are generally not available. Advantageously, in the current system such data is made available, and the management unit is arranged to acquire, from the link layer below the communication management layer, first security data identifying the security mechanism of the first secure link connection. Also a hierarchy or classification of different security mechanisms is determined, e.g. via a table, list or from a remote database. Various cryptographic operations have been discussed in the introduction, and may be included in such tables, or may be part of security mechanisms identified in such a database. So, based on both the actual link layer security details and the classification of the actual security mechanism of the first link connection and the required security mechanism, the unit reliably determines whether a second security mechanism is required, and if so a second different link layer connection is set up.

Optionally the security processor comprises a link control unit arranged to operate at the link layer below a communication management layer and to determine first security data identifying the security mechanism of the first secure link connection, and to provide the first security data upon request to the communication management layer for enabling establishing whether the further service requires a different security mechanism. The link control unit is operationally active in the lower network link layer and may control the actual security set up of the link connection. By being operational at such a lower layer, details of the lower layer are normally not available to higher layers. Advantageously, the link control unit is arranged to provide, from the link layer to the higher communication management layers, first security data identifying the security mechanism of the first secure link connection.

Optionally the security processor is arranged, for determining that the further service requires a link layer security according to a second security mechanism different from the first security mechanism, to exchange a connection capability request message with the further communication device, the connection capability exchange message indicating at least one supported security mechanism. For example, the connection capability exchange message may be an IEEE 802.11 management frame or action frame (such as a P2P Probe Request, Provision Discovery Request) with the further communication device, containing connection capability information and configuration method information indicating at least one supported security mechanism. The connection capability message may be used to indicate to the service seeker that the service seeker has to set up an additional P2P connection, or may not reuse an existing P2P connection. Exchanging the connection capability request message is a suitable mechanism to determine the required security mechanism. For example, the security processor of the communication device acting as service provider is arranged to determine that further service requires a specific link layer security according to a second security mechanism, e.g. based on a table of security mechanisms for respective services. For example the connection capability message may indicate one or more allowed mechanisms for the second service. Then the service provider will send the connection capability request message, and the service seeker will receive such message. Subsequently the service seeker may select one of the offered mechanisms. Alternatively, the security processor of the communication device acting as the service seeker may start the message exchange by sending the connection capability request message, while indicating security mechanisms that the service seeker supports. Also, various other possible message exchanges or mechanisms may be applied to determine and/or select the required, different second security mechanism.

Optionally the security processor of the communication device acting as service provider is arranged, for determining that the further service requires a link layer security according to a second security mechanism different from the first security mechanism, to detect a session request message from the service seeker indicative of a further service, which further service requires a link layer security according to a second security mechanism different from the first security mechanism and subsequently to send a session reject message to the service seeker including an error code indicative of the further service requiring a different link layer security. Also, the security processor of the communication device acting as service seeker may be arranged, for detecting that the further service requires a link layer security according to a second security mechanism different from the first security mechanism, to send a session request message to the service provider indicative of a further service and subsequently to receive a session reject message from the service provider including an error code indicative of the further service requiring a different link layer security. Advantageously the session request message clearly indicates that the service seeker requests a further service, while the session reject message indicates that session cannot be granted. In particular the error code indicates that the current channel has a different security level, i.e. is based on a different security mechanism, so that the service seeker is made aware that a different link layer security is required, and the process of setting up the second secure link connection.

Optionally, the security processor is arranged, for establishing the second secure link connection while the first secure link connection remains active as a Wi-Fi connection on a channel in a first band, to establish a different Wi-Fi connection in a different band or on a different channel in the first band. Advantageously, a different Wi-Fi connection in a different band or on a different channel in the first band will substantially not affect the transmission of messages via the first secure link.

Optionally the security processor is arranged, subsequent to establishing the second secure link connection while the first secure link connection remains active, to determine whether the first service allows a link layer security of the second type using the second security mechanism and, if so, to route traffic from the first secure link connection to the second secure link connection, and close the first secure link connection. In this context routing may mean rerouting so that the communication unit still acts as if the first link with the first MAC address still exists, and actively processes incoming messages to go a different route. Alternatively it is possible that the first link is really replaced with the second link and that the communication really uses the second MAC address from that point on.

Optionally the security processor is arranged for establishing a priority for the at least two services, and in dependence on the priority, establishing the second secure link connection via a selected communication channel and/or prioritize messages of the first and/or second service on the first and second secure link connection. Advantageously the priority as established enables selecting, for high priority messages, a communication channel having a higher bandwidth or a cleaner communication channel.

Optionally the security processor of the communication device acting as service provider is arranged, upon determining that the further service requires a link layer security according to a second security mechanism different from the first security mechanism, to send a security message to the service seeker that the further service requires a different link layer security. Also, the security processor of the communication device acting as service seeker may be arranged, for detecting that the further service requires a link layer security according to a second security mechanism different from the first security mechanism, to receive the security message from the service provider that the further service requires a different link layer security. Advantageously, the service seeker receives a message from the service provider that the further service requires a different link layer security, so an appropriate further protocol or message exchange is triggered to set up the second link connection. Also, the security processor of the communication device acting as service provider may be arranged to send the security message upon detecting that the service seeker tries to engage the further service through the first secure wireless connection. Advantageously, by detecting that the service seeker tries to access the further service through the first secure wireless connection, the service provider is aware of the current status of the device seeker and the service provider is enabled to trigger the further protocol for establishing the second link connection.

A method according to the invention may be implemented on a computer or a mobile device as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. The computer program product may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is provided a computer program product downloadable from a network and/or stored on a computer-readable medium and/or microprocessor-executable medium, the product comprising program code instructions for implementing a method as described above when executed on a computer.

Another aspect of the invention provides a method of making the computer program available for downloading, for example included in a location based application. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF THE EMBODIMENTS

Some services require more security than others, and hence may need a different security mechanism, e.g. including additional security or authentication measures. So the proposed system enables underlying wireless connectivity layer to be instructed to take care of multiple security mechanisms, while applications may find out about the underlying wireless authentication and security methods being used. The idea is to add the necessary hooks and handles on the lower communication layers to enable retrieval of the security data, and further define a mechanism to send a message to the service seeker to indicate that a different authentication and security method is needed in order to get access to the additional service that it wishes to engage. So the service seeker is enabled to connect to an additional service in such a way that it does not interrupt communication with an initial service that is already using a secure link connection.

If the user initially wants to use a service that requires basic security, the connection will be set up accordingly. If the user later decides to use an additional service requiring a different security level on a service provider device, then the service seeker device will receive the necessary information to be able to guide the user to do the necessary steps to set up a second secure link connection that meets the authentication and security requirements of the security mechanism of the desired services, whilst not interrupting ongoing service sessions. Setting up a second secure link connection generally requires less user interaction and is more efficient than using application level security on top of a based secure link connection.

Figure 1:
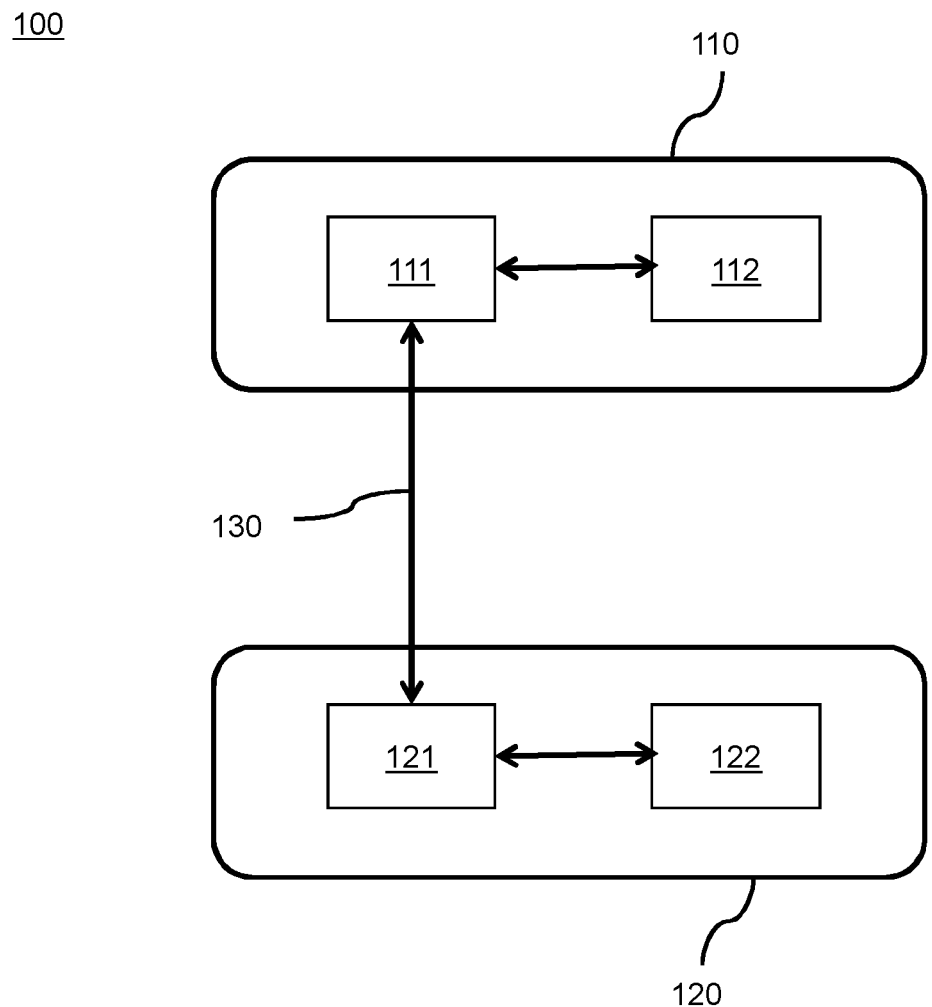
FIG. 1 shows communication devices in a secure wireless communication system.

FIG. 1 shows communication devices in a secure wireless communication system. The system 100 for secure wireless communication comprises a first device 110 and a second device 120. The first communication device has a security processor 112 and a wireless transceiver 111, while the second communication device has a security processor 122 and a wireless transceiver 121 arranged to establish secure interaction between the communication devices according to a security protocol. The security protocol defines a link layer security according to a security mechanism. In the description below the communication device is arranged to act as a service seeker, while the second communication device arranged to act as a service provider, the respective security processors being arranged to execute the respective operations of the service seeker and the service provider. In practice, the communication device and security may also be arranged to execute both the service seeker and the service provider, while the respective role is engaged in dependence of the practical system configuration.

The devices are equipped for wireless communication, as schematically indicated by the arrow 130 which connects the transceivers 111,121. The devices are arranged for secure communication for engaging a service via the wireless communication according to a security mechanism between the first device and the second device. The security mechanism may include authentication and a security protocol for establishing a secure link between the first and the second device, as further detailed below with reference to FIG. 2.

In the examples below the predetermined protocol is Wi-Fi according to IEEE 802.11 [ref 1], but other wireless protocols may also be used, such as Bluetooth, when provided with an appropriate security mechanism.

In the exemplary embodiments various functions are described to be executed in the security processor 112,122, such as functions of establishing a connection on a link layer, executing the security mechanism, managing the security and/or the link, executing applications on high layers, etc. However, in practical embodiments, multiple processors may be applied and constitute a hardware processing arrangement embodying the security processor in the communication device. Processing arrangements for communication devices are known as such, for example a mobile phone or tablet computer having a CPU, a wireless communication processor and a dedicated security unit. The dedicated security unit may be known as such, while allowing further programming for the added security functionality. An example of a known dedicated security unit is: http://www.nxp.com/pages/security-processor:MPC190 [ref3].

So the security processor may have a single processor, memory and further control logic, or may have dedicated processors for respective functions. The security processor is now extended by hardware and/or software to execute the service seeker and service provider operations as elucidated below.

The security processor 112 of the communication device acting as service provider is arranged to execute the following service provider operations. First at least a first service is enabled, the first service requiring a link layer security according to a first security mechanism. For example, at least a first service may be advertised by the service provider in a service advertising message. The first service requires a link layer security of a first type using a first security mechanism, which may be indicated in the service advertising message or in a further service information message. Then the service provider may receive a service request message from the service seeker. Subsequently a first secure link connection is established with the service seeker on a link layer according to the first security mechanism. Finally, the first service is engaged via the first secure link connection.

The security processor 122 of the communication device acting as service seeker arranged to execute the following service seeker operations. A first service is detected as provided by the service provider. For example, a service advertising message may be received from the service provider and a first service may be selected to be engaged. The selection of the first service may be based on the service advertising message, and/or further service information messages as transmitted by the service provider. Alternatively, the service seeker may detect an available service via a predetermined configuration scheme, such as a build in configuration table, or may get information about available services from a further device such as a server via a network connection. Then a first secure link connection is established with the service provider on a link layer according to the first security mechanism. Finally, the first service is engaged via the first secure link connection.

The security processor of the communication device acting as service provider is arranged to execute the following further service provider operations. At least a further service is enabled, e.g. in the same advertising message as described above, or in a separate message, or in a further suitable way. The processor determines that the further service requires a link layer security according to a second security mechanism different from the first security mechanism. For example, the processor may detect that a different authentication process is required. Subsequently a second secure link connection is established with the service seeker on the link layer according to the second security mechanism while the first secure link connection remains active. So any data traffic and/or message relating to the first service are not interrupted but continue to be handled via the first secure link connection. In addition, the processor engages the further service via the second secure link connection, while blocking the service seeker from accessing the further service until the second secure link connection has been established.

The security processor of the communication device acting as service seeker is arranged to execute the following further service seeker operations. The processor detects that the further service requires a link layer security according to a second security mechanism different from the first security mechanism, for example from a service advertisement message or a further service information message. Then the processor establishes a second secure link connection with the service provider on the link layer according to the second security mechanism while the first secure link connection remains active. Finally, the processor engages the further service via the second secure link connection.

In an embodiment of the above communication device, the first security mechanism includes a first authentication protocol and the second security mechanism includes a second authentication protocol different from the first authentication protocol. Also, the first security mechanism may include a first set of cryptographic operations and the second security mechanism may include a second set of cryptographic operations different from the first set of cryptographic operations. So the device supports different authentication protocols and/or sets of cryptographic operations for engaging respective different services.

In an embodiment of the above communication device, the secure link connection on the link layer is an authenticated and secure MAC transport layer connection using a first seeker MAC address and a first provider MAC address. The security processor is arranged to establish the second secure link connection using a second seeker MAC address and a second provider MAC address. The second seeker MAC address is different from the first seeker MAC address and the second provider MAC address is different from the first provider MAC address. So, by using respective different MAC addresses, setting up separated link layer connections is effectively achieved. The second MAC transport layer connection is set up while the first MAC transport layer connection remains unaffected and hence active.

In an embodiment the security processor comprises a security management unit. For example, this unit may be a separate processor, or a functional unit in the security processor, or a software implemented function. The security management unit is operationally active in the higher network application layers and may control the selection and activation of respective services.

The security management unit is arranged to operate at a communication management layer above the link layer. The unit determines that the further service requires a link layer security according to the second security mechanism different from the first security mechanism by determining a hierarchy or classification of different security mechanisms. The hierarchy or classification of different security mechanisms is determined, e.g. via a table, list or from a remote database. So the hierarchy may be predetermined, stored or retrieved via a network, or may be determined on predefined criteria, e.g. a ranked listing of security mechanisms, or indicating the assumed strength of the cryptographic operations. The classification may indicate that respective security mechanisms qualify for a predefined level according to a standardized classification scheme. Also, the unit acquires, from the link layer below the communication management layer, first security data identifying the security mechanism of the first secure link connection. Due to being operational at a higher layer, details of the lower layers such as the link layer are not available in prior systems. In the current system, such first security data is made available by the lower layers, in particular by a link control unit at the link layer. Finally, the security processor establishes, based on the first security data and security data of the further service, whether the further service requires a different security mechanism. So, based on both the actual link layer security details and the classification of the actual security mechanism of the first service and required security mechanism of the further service, the unit reliably determines whether a second, different link layer mechanism is required.

In an embodiment the security processor comprises a link control unit arranged to operate at the link layer below a communication management layer. The security processor determines first security data identifying the security mechanism of the first secure link connection, and provides the first security data upon request to the communication management layer for enabling establishing whether the further service requires a different security mechanism. The link control unit is operationally active in the lower network link layer and may control the actual security set up of the link connection. By being operational at such a lower layer, the link control unit makes details of the lower layer available to higher layers. So the link control unit is arranged to provide, from the link layer to the higher communication management layers, first security data identifying the security mechanism of the first secure link connection.

In an embodiment the security processor is arranged to execute the following operations for determining that the further service requires a link layer security according to a second security mechanism different from the first security mechanism. The processor exchanges a connection capability request message with the further communication device. The connection capability exchange message indicates at least one supported security mechanism. For example, the connection capability exchange message may be an IEEE 802.11 management frame or action frame (such as a P2P Probe Request, Provision Discovery Request) containing connection capability information and WPS configuration method information indicating at least one supported security mechanism. Exchanging the IEEE 802.11 management frame or action frame is a suitable mechanism to determine the required security mechanism. The connection capability exchange occurring as part of this exchange may be used to indicate to the service seeker that it has to set up an additional P2P connection and not reuse an existing P2P connection.

The security processor of the communication device acting as service provider may be arranged to determine that further service requires a specific link layer security according to a second security mechanism, e.g. based on a table of security mechanisms for respective services. For example the connection capability message may indicate one or more allowed mechanisms for the second service. Then the service provider will send the connection capability request message, and the service seeker will receive such message. Subsequently the service seeker may select one of the offered mechanisms. Alternatively, the security processor of the communication device acting as the service seeker may start the message exchange by sending the connection capability request message, while indicating security mechanisms that the service seeker supports.

In an embodiment the security processor of the communication device acting as service provider is arranged to execute the following operations for determining that the further service requires a link layer security according to a second security mechanism different from the first security mechanism. The processor detects a session request message from the service seeker indicative of a further service. However, the further service requires a link layer security according to a second security mechanism different from the first security mechanism. Then the processor sends a session reject message to the service seeker including an error code indicative of the further service requiring a different link layer security. Also, the security processor of the communication device acting as service seeker may be arranged to execute the following operations for detecting that the further service requires a link layer security according to a second security mechanism different from the first security mechanism. The processor sends a session request message to the service provider indicative of a further service and subsequently to receive a session reject message from the service provider including an error code indicative of the further service requiring a different link layer security. So the session request message clearly indicates that the service seeker requests a further service, while the session reject message indicates that session cannot be granted based on the existing first secure link connection. In particular the error code indicates that the current channel has a different security level, i.e. is based on a different security mechanism, so that the service seeker is made aware that a different link layer security is required, and the process of setting up the second secure link connection.

In an embodiment the security processor is arranged to execute the following operations for establishing the second secure link connection while the first secure link connection remains active. For example the first secure link connection is a Wi-Fi connection on a channel in a first band. The processor then establishes a different Wi-Fi connection in a different band or on a different channel in the first band. The different Wi-Fi connection in a different band or on a different channel in the first band will substantially not affect the transmission of messages via the first secure link.

In an embodiment the security processor is arranged to execute the following operations subsequent to establishing the second secure link connection while the first secure link connection remains active. The processor determines whether the first service allows a link layer security of the second type using the second security mechanism. If so, the processor routes traffic from the first secure link connection to the second secure link connection and closes the first secure link connection. In this context routing may mean rerouting so that the communication unit still acts as if the first link with the first MAC address still exists and actively processes incoming messages to go a different route. Alternatively the first link may be replaced with the second link and the communication unit really uses the second MAC address from that point on.

In an embodiment the security processor is arranged for establishing a priority for the at least two services. The processor may establish, in dependence on the priority, the second secure link connection via a selected communication channel. Additionally, or alternatively, the processor may prioritize messages of the first and/or second service on the first and second secure link connection. The priority as established enables selecting, for high priority messages, a communication channel having a higher bandwidth or a cleaner communication channel.

In an embodiment the security processor of the communication device acting as service provider is arranged to execute the following operations upon determining that the further service requires a link layer security according to a second security mechanism different from the first security mechanism. The processor sends a security message to the service seeker that the further service requires a different link layer security. Also, the security processor of the communication device acting as service seeker may be arranged to execute the following operations for detecting that the further service requires a link layer security according to a second security mechanism different from the first security mechanism. The processor receives the security message from the service provider that the further service requires a different link layer security. Effectively the service seeker receives a message from the service provider that the further service requires a different link layer security, so an appropriate further protocol or message exchange is triggered to set up the second link connection. Also, the security processor of the communication device acting as service provider may be arranged to send the security message upon detecting that the service seeker tries to engage the further service through the first secure wireless connection. Advantageously, by detecting that the service seeker tries to access the further service through the first secure wireless connection, the service provider is aware of the current status of the device seeker and the service provider is enabled to trigger the further protocol for establishing the second link connection.

Figure 2:
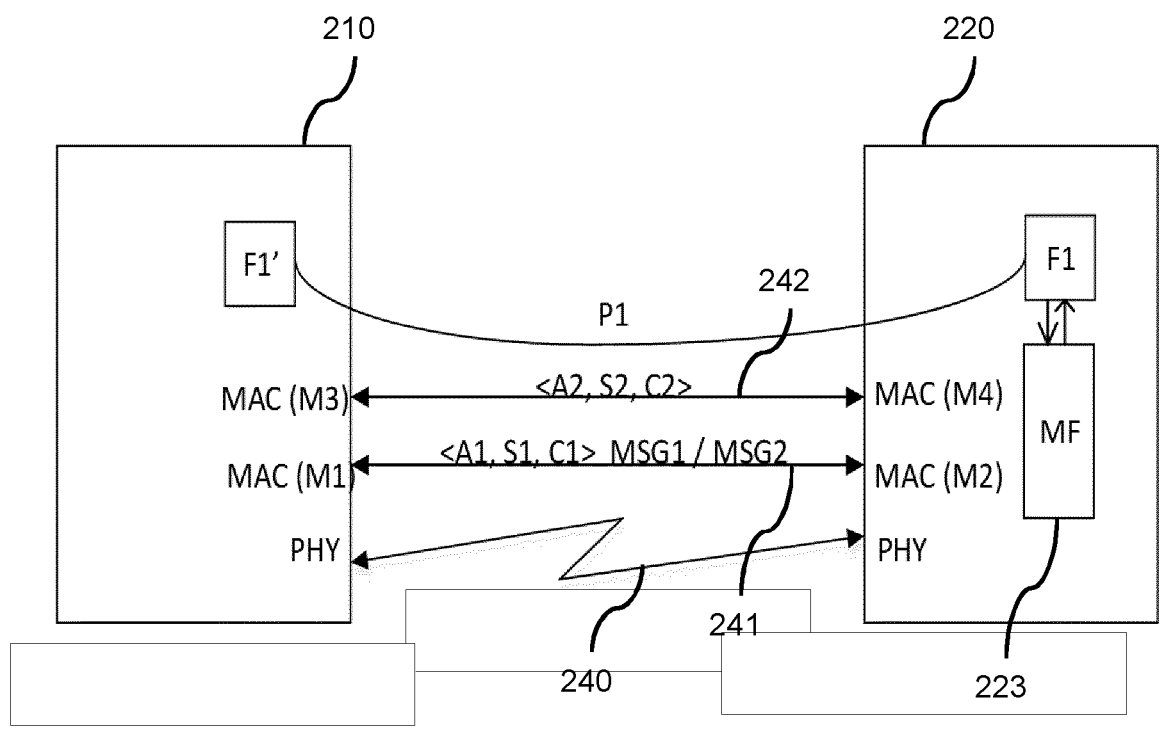
FIG. 2 shows in a schematic diagram two communication devices and two secure link connections.

FIG. 2 shows in a schematic diagram two communication devices and two secure link connections. A first communication device 210 is a service seeker and a second communication device 220 is a service provider. On a physical layer the device wirelessly communicate as indicated by arrow 240. On a link layer a first secure link layer connection 241 uses MAC addresses MAC (M1) and MAC (M2), while a second link layer connection 242 uses MAC addresses MAC (M3) and MAC (M4). On the first link layer connection 241 a first security mechanism is applied by messages that include a first authentication A1, a first security protocol S1 and first cryptographic operations C1 as schematically indicated by "<A1, S1, C1>MSG1/MSG2". On the second link layer connection 242 a second security mechanism is applied by messages that include a second authentication A2, a second security protocol S2 and second cryptographic operations C2 as schematically indicated by "<A2, S2, C2>". The security mechanisms are controlled by a Management unit MF 223, which communicates to a different communication layer on which a service F1 is provided to the service seeker having an application F1' needing the service. The exemplary embodiment is now further elucidated.

In the embodiment, the communication devices 210,220 establish a secure link connection using authentication method A1, security protocol S1 and cryptographic algorithm set C1. This may be a Wi-Fi P2P connection if the devices support Wi-Fi Direct or may be a Wi-Fi Infrastructure connection if the service provider is a Wi-Fi Access Point and device the service seeker is a Wi-Fi Station. The service provider operates an Application Service Platform (ASP) that offers a service F1. The service may be advertised to the service seeker either using pre-association discovery protocol such as through beacon frames, probe response frames, GAS/ANQP response frames, IEEE 802.11q frames. The service seeker acts to discover and initiate interaction with service F1. Optionally the service provider may host a management function MF which can communicate with service F1 and vice versa in order to communicate which Wi-Fi authentication method(s), security protocol(s), and cryptographic algorithm set(s) are minimally required in order to get access to service F1. It is noted that the management function MF and service F1 are shown as separate entities. However, the two entities may be also combined, i.e. a single processing unit may include management function MF and the service F1 as part of its functionality.

Optionally, the service F1 may not desire that the connection was setup up using persistent connection information, and may find out and/or request a different authentication to be used or request the authentication to be done anew. The management function MF has the ability to detect, monitor or keep track of the Wi-Fi authentication methods, security protocols and cryptographic algorithm sets being used for the Wi-Fi connections. The management function MF may further be arranged to block messages received at MAC address M2 from reaching service F1 if the authentication method A1 or security method S1 or cryptographic algorithm set C1 by which the MAC connection was set up does not match the requirements of service F1, for example by blocking access to the IP ports on which service F1 listens for incoming application protocol messages.

Optionally the management function MF may operate a hierarchy or classification of different authentication methods, security protocols and/or cryptographic algorithm sets to decide if A1 or S1 meets the requirements for service F1. MF is further arranged to send a message MSG2 to the service seeker if the service seeker attempts to reach F1 through a first message MSG1. The first message may be received by the service provider, e.g. one of the following messages:
a) an ASP coordination protocol message such as ASP REQUEST_SESSION, requesting access to service F1;
b) a connection capability exchange message indicating the currently used and/or supported authentication methods, security methods and/or cryptographic algorithm sets by a service seeker requesting to set up a connection with the service provider acting as a service advertiser;
c) a wireless docking coordination protocol message to select or request a connection to a peripheral for use in wireless docking where a wireless docking service manages access to a set of peripheral function services (e.g. a Miracast service, Wi-Fi Serial Bus service, Wi-Fi P2P Send Service, Wi-Fi P2P Print service, etc);
d) an application protocol P1 specific message addressed to F1;
e) a PD Request frame requesting access to F1 or addressed to F1.

In response the service provider may send a second message MSG2, which may for example be:
a) an ASP coordination protocol message, such as REJECT SESSION, that includes error information that the service seeker was refused access to service F1 due to insufficient security of the underlying MAC connection, and that includes information about a different authentication method A2≠A1 or different security protocol S2≠S1 or different cryptographic algorithm set C2≠C1 to be used in order to access service F1;
b) a connection capability exchange message indicating an authentication method, security method and/or cryptographic algorithm set, that has been selected by the service provider to be used for setting up a connection by the service seeker to the service provider;
c) a wireless docking coordination protocol return message including information about using a different authentication method A2 or different security protocol S2 or different cryptographic algorithm set C2 to be used in order to access service F1 than the A1, S1 and C1 used for setting up connection with the wireless docking service;
d) an outgoing Provision Discovery Request to the service seeker that includes the information to set up a second connection;
e) an application protocol P1 specific message or other message that provides the necessary information to instruct the service seeker to set up a Wi-Fi connection using a different authentication method A2≠A1 or different security protocol S2≠S1 or different cryptographic algorithm set C2≠C1 in order to access service F1.

The service provider continues to block access to service F1 until the service seeker has set up a second Wi-Fi connection using the different authentication method A2 or different security protocol S2 or different cryptographic algorithm set C2 that matches the requirements of service F1 and the service seeker communicates or requests to communicate with service F1 using the second Wi-Fi connection. Communication to F1 over the first wireless connection will continue to be blocked.

In an embodiment, the second Wi-Fi connection is set up and continues to run simultaneously with the first Wi-Fi connection, in order to prevent communication interruptions on the first Wi-Fi connection. This avoids possible user frustrations, if for example a file transfer would be interrupted and would need to be restarted, if an ongoing video or voice call would be interrupted, or if streaming video data to a display or music streamed to a speaker would suddenly stop or show hick ups. In practice the service seeker and the service provider are arranged to operate multiple virtual network interfaces and manage multiple MAC addresses, e.g. separate P2P interface addresses for each connection. In the event of P2P, either the service seeker or the service provider need to start another P2P Group Owner (GO) to which the peer device can connect to start the second Wi-Fi connection, simultaneously with the P2P Group owner operating the first Wi-Fi connection. In an embodiment, the service provider starts the GO that will be used for the second connection before, or as soon as, the service seeker tries to access service F1. The service provider may send, as part of the MSG2, instruction information about the GO and parameters with which the service seeker should initiate the connection.

Generally the first and second connections are both the same type, e.g. both Wi-Fi Direct connections, but they may also be of a different type. For example, the second Wi-Fi connection may be an infrastructure connection, whereas the first connection may be a Wi-Fi direct connection, or vice versa.

In a further embodiment, if both devices support simultaneous dual-band operation (e.g. simultaneous 2.4 and 5 GHz) or tri-band operation (e.g. 2.4, 5, and 60 GHz), the second Wi-Fi connection may run on a different Wi-Fi band/frequency range than the first Wi-Fi connection. Communication operations that require less bandwidth may be run over the lower frequency bands and the communication operations that require more bandwidth may be run over the higher frequency bands. Information to facilitate this choice may be transferred using MSG2, e.g. by indicating for each service its bandwidth and/or latency requirements or preferred operating channel. For example, if the service seeker and the service provider are connected through a first Wi-Fi connection to access a wireless docking management/coordination service that requires little bandwidth, and the service F1 that the service seeker wishes to access is a Wi-Fi Serial Bus or Miracast service that requires more bandwidth, the service seeker could be instructed to have the first Wi-Fi connection operating in the lower 2.4 GHz band, whereas the second Wi-Fi connection running the Wi-Fi Serial Bus or Miracast service connection is set up to operate simultaneously in the higher 5 GHz band. Changing a Wi-Fi operating channel or frequency band whilst in operation can be achieved by sending a Channel Switch Announcement frame or by using the Fast Session Transfer (FST) protocol.

In a further embodiment, the first and/or second wireless connection is used to transfer synchronization information (e.g. based on 802.1AS) to optimize the communication operation by synchronizing access to the wireless medium by the two stations. For example the communication devices may be arranged to synchronize a contention window and/or backoff interval used for each of the two Wi-Fi connections, while assuming there are no additional stations use the respective channels, send/listen intervals at a certain Wi-Fi operating channel used by the two stations, and/or transmission opportunity (TXOP) intervals used by the two stations.

In another embodiment, if the devices do not support simultaneous dual-band or tri-band operation, the two Wi-Fi connections may be set up to run on two different channels using frequency hopping, or may share the same Wi-Fi channel, whilst operating a different security/encryption method and different MAC addresses. In order to maximize the throughput or minimize the latency for the user, the service seeker may optimize access to the wireless medium for the two different wireless connections, e.g. by setting different WMM QoS access categories for communication over the different connections. Wi-Fi Multimedia Quality of Service (WMM QoS) prioritizes wireless voice and video traffic over a WiFi link. Also, access may be optimized by determining and using the channel which is first idle/clear to send. Also, access may be optimized by synchronizing or concatenating TXOP intervals or by sharing TXOP intervals, e.g. using part of a TXOP interval used for transmitting frames from MAC M1 of the service seeker to MAC M2 of the service provider, and part of the TXOP interval used for transmitting frames from MAC M3 of the service seeker to MAC M4 of the service provider. Also, access may be optimized by operating separate traffic queues for each of the two wireless connections with different priority.

In another embodiment, access may be optimized by operating the application requiring access to service F1 of the service provider over the second wireless connection with higher processor priority than applications accessing functions of the service provider over the first wireless connection. In order to facilitate this, the service provider may provide information in MSG2 as to which communication operations have higher priority. The service seeker can use this information to decide if messages for the first or second Wi-Fi connection have priority and should be sent earlier or more often. Alternatively, if the service provider acts as the group owner or access point for the two Wi-Fi connections between the service seeker and the service provider, the service provider may operate QoS admission control for each of the two Wi-Fi connections, may set different TXOP limits, may determine power saving intervals and other parameters to optimize access to the wireless medium for the two simultaneous Wi-Fi connections.

In a further embodiment, the first secure link connection may be closed when the second secure link connection is operational. The service seeker may reroute the MAC/IP traffic from the first Wi-Fi connection over the second Wi-Fi connection, if the second Wi-Fi connection is set up using authentication method A2 or security protocol S2 or cryptographic algorithm set C2 that meets the requirements of the communication operated over the first secure link connection.

Figure 3:
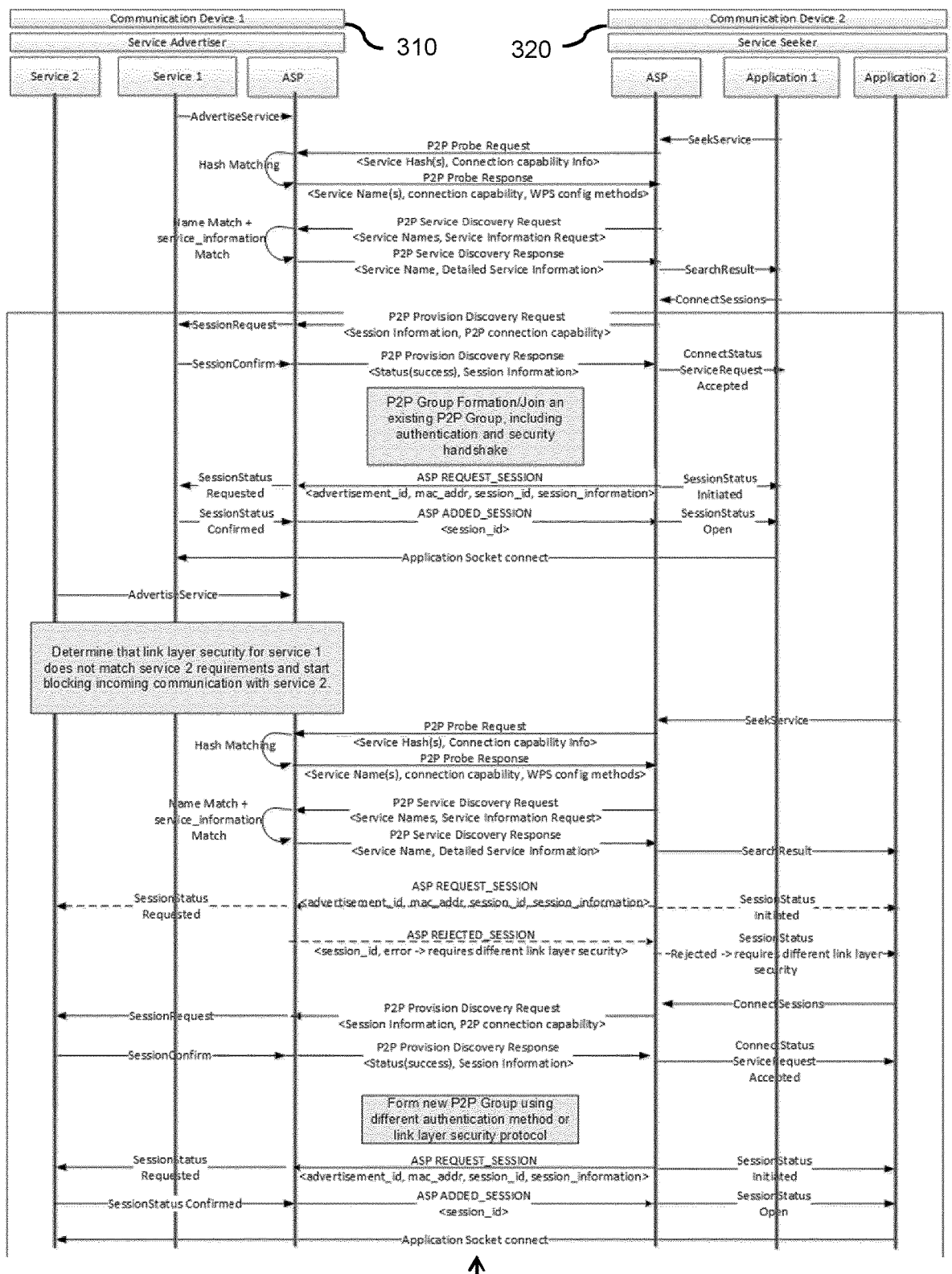
FIG. 3 shows a schematic diagram of security mechanisms for engaging services.

FIG. 3 shows a schematic diagram of security mechanisms for engaging services. The security mechanisms 300 are shown between a first communication device (DEVICE 1) acting as a service provider device 310, also called service advertiser, and a second communication device (DEVICE 2) acting as a service seeker device 320. Protocol messages are shown to be exchanged between a first Application Service Platform (ASP) in the first communication device and a second Application Service Platform (ASP) in the second communication device. The secure processor in the service provider may pass on messages internally in the provider device to a higher communication layer where at least two services (SERVICE 1, SERVICE 2) are made available. The secure processor in the service seeker may pass on messages internally in the seeker device to a higher communication layer where at least two applications (APPLICATION 1, APPLICATION 2) are present, which require use of the respective services (SERVICE 1, SERVICE 2) in the service provider.

According to the protocol the first device DEVICE1 exchanges messages to a second device DEVICE2, as indicated by arrows between the vertical timelines representing the progress of time in downward direction. The Figure also shows messages internally in the communication device between the ASP process and the service or application between respective vertical timelines extending from the ASP unit and the services or applications. Only the messages between the two ASPs take place over the air. The majority of messages is known as such (see [ref 1]) for engaging a single service. The devices now exchange the following sequence of messages to engage two services at different security levels via respective secure link connections:

AdvertiseService: advertises one or more services;
SeekService: seek a first service;
P2P Probe Request <Service Hash(s), Connection capability Info>: a service request message that contains a Peer to Peer service request having hash codes and connection capability information. The P2P Probe Request is a frame with Service Hash, Connection capability info as data attributes inside that P2P Probe Request Frame, as indicated between pointed brackets < >.

After a Hash matching is performed in the service provider device, the sequence continues by:

P2P Probe Response <Service Name(s), connection capability, WPS config methods>: service request message that contains matching service names, the connection capability that the service provider proposes to the service seeker to use, and the Wi-Fi Protected Setup (WPS) configuration methods supported by the device. Wi-Fi Protected Setup is also known as Wi-Fi Simple Configuration (see ref [1]).

Next the sequence continues, after name match and service information match is performed in the service provider device, by:

P2P Service Discovery Request <Service Names, Service Information Request>:
Service discovery request data;
P2P Service Discovery Response <Service Name, Detailed Service Information>:
Service discovery response data;
SearchResult: reports that the requested service is found.

Next the sequence continues, to set up a session, by:
ConnectSessions;
P2P Provision Discovery Request <Session Information, P2P connection capability>;
SessionRequest;
SessionConfirm;
P2P Provision Discovery Response <status(success), Session Information>;
ConnectStatus Service Request Accepted.

Next P2P Group Formation or Join an existing P2P Group is performed. The function "P2P Group Formation" is a shortcut for a multiple possible message exchanges. These can be found in the Wi-Fi P2P specification.

Next the process includes aN authentication method or link layer security protocol. The authentication and security handshakes typically take place after group formation. They may actually be two blocks, because they are typically implemented as separate steps. An example of such message exchange is defined in the Wi-Fi Protected Setup (WPS) spec (also known as Wi-Fi Simple Config). The sequence continues by:

ASP REQUEST_SESSION <advertisement_id, mac_addr, session_id, session_information>;
SessionStatus Requested;
SessionStatus Initiated;
ASP ADDED_SESSION <session_id>;
SessionStatus Confirmed;
SessionStatus Open;

Now the application actually can start using the first service, by the message
Application Socket connect;

While the first service is being used, a second service may be initiated by the following sequence. Next the process includes a different authentication method or link layer security protocol, i.e. different from the security mechanism used when engaging the first service in the first part of the Figure. The sequence may continue by:

AdvertiseService: second service being advertised.

The security processor determines that link layer security for service 1 does not match service 2 requirements and start blocking incoming communication with service 2. Subsequently a further sequence is executed to engage the second service via a second link connection, as follows:

SeekService: seek second service
P2P Probe Request <Service Hash(s), Connection capability Info>;

Then Hash Matching is performed in the service provider device.

P2P Probe Response <Service Name(s), connection capability, WPS config methods>;
P2P Service Discovery Request <Service Names, Service Information Request; Name Match+service_information Match is performed in the service provider device, then:
P2P Service Discovery Response <Service Name, Detailed Service Information>;
SearchResult: second service found;
ASP REQUEST_SESSION <advertisement_id, mac_addr, session_id, session_information>;
SessionStatus Requested;
SessionStatus Initiated;
ASP REJECTED SESSION <session_id, error (requires different link layer security)>;
SessionStatus Rejected <(requires different link layer security)>;

In the session reject message an error code is included that indicates that a different link layer security is required. Now a new session is initiated:

ConnectSessions;
P2P Provision Discovery Request <Session Information, P2P connection capability>;
SessionRequest;
SessionConfirm;
P2P Provision Discovery Response <status(success), Session Information>;
ConnectStatus Service Request Accepted;

Now the second secure link connection is set up. A new P2P Group may be formed using different authentication method or link layer security protocol:

ASP REQUEST_SESSION <advertisement_id, mac_addr, session_id, session_information>;
SessionStatus Requested;
SessionStatus Initiated;
ASP ADDED_SESSION <session_id>;
SessionStatus Confirmed;
SessionStatus Open;

Now the application actually can start using the second service, by

Application Socket connect.

Figure 4:
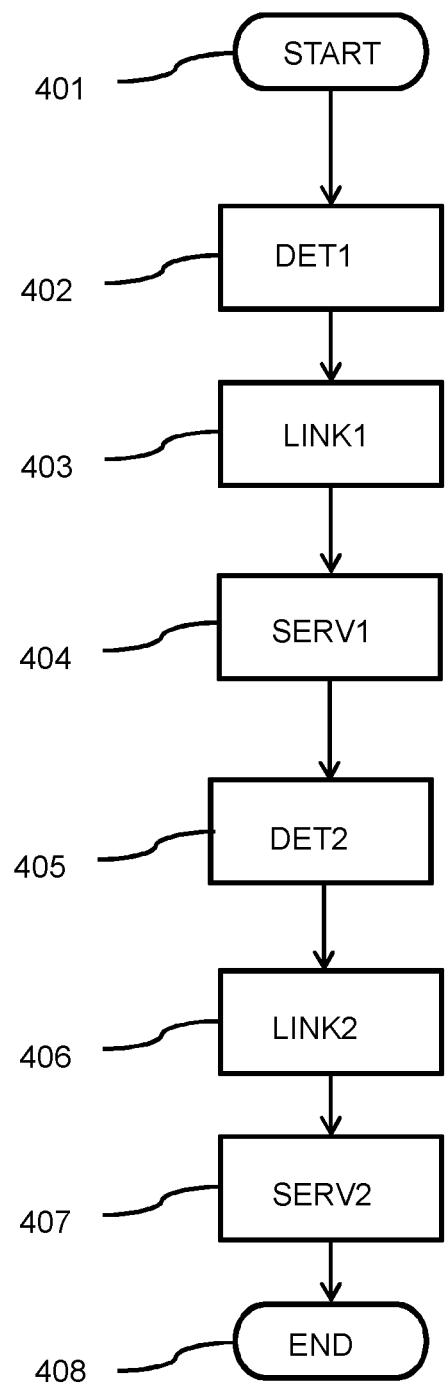
FIG. 4 shows a service seeker method.

FIG. 4 shows a service seeker method. The method is for use in a secure wireless communication system comprising a communication device and a further communication device as described above. The method, when executing in the security processor, makes the communication device act as a service seeker, while communicating with a further communication device acting as a service provider. The method starts at node START 401. In a first stage DET1 402 a first service is detected as provided by the service provider. Next in stage LINK1 403 a first secure link connection is established with the service provider on a link layer according to the first security mechanism. Next the first service in stage SERV1 404 is engaged via the first secure link connection. Then the service seeker method further continues in stage DET2 405 by detecting that the further service requires a link layer security according to a second security mechanism different from the first security mechanism. In stage LINK2 406 a second secure link connection with the service provider on the link layer is established according to the second security mechanism while the first secure link connection remains active. Finally the further service is engaged in stage SERV2 407 via the second secure link connection. The method terminates at node END 408.

Figure 5:
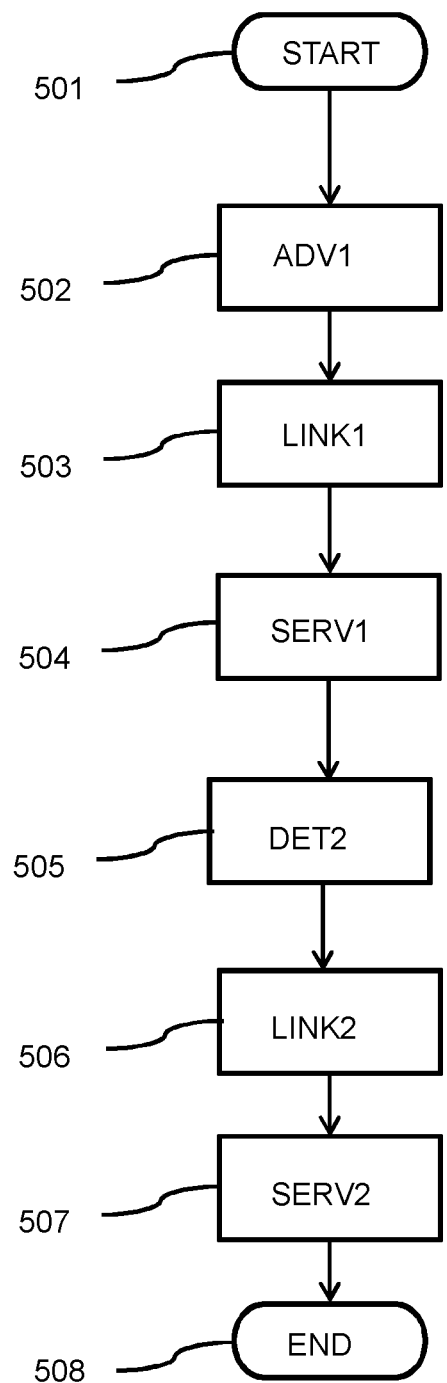
FIG. 5 shows a service provider method.

FIG. 5 shows a service provider method. The method is for use in a secure wireless communication system comprising a communication device and a further communication device as described above. The method, when executing in the security processor, makes the communication device act as a service provider, while communicating with a further communication device acting as a service seeker. The method starts at node START 501. Then in stage ADV1 502 at least a first service is made available, the first service requiring a link layer security according to a first security mechanism. The service may be advertized or otherwise made available. Upon receiving a request for using the service, in next stage LINK1 503 a first secure link connection is established with the service seeker on a link layer according to the first security mechanism. Next in stage SERV1 504 the first service is engaged via the first secure link connection. The service provider method further continues by making available a further service. Then in stage DET2 505 it is determined that the further service requires a link layer security according to a second security mechanism different from the first security mechanism. Next in stage LINK2 506 a second secure link connection is established with the service seeker on the link layer according to the second security mechanism while the first secure link connection remains active. Next in stage SERV2 507 the further service is engaged via the second secure link connection, while blocking the service seeker from accessing the further service until the second secure link connection has been established.

Computer program products, downloadable from a network and/or stored on a computer-readable medium and/or microprocessor-executable medium, are provided that comprise program code instructions for implementing the above methods when executed on a processor in a communication device, as elucidated further below.

Typically, the communication device comprises a processor which executes appropriate software stored at the devices; for example, that software may have been downloaded and/or stored in a corresponding memory, e.g., a volatile memory such as RAM or a non-volatile memory such as Flash (not shown). The devices and servers may for example be equipped with microprocessors and memories (not shown). Alternatively, the devices and server may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Many different ways of executing the method are possible, as will be apparent to a person skilled in the art. For example, the order of the stages or steps can be varied or some stages may be executed in parallel. Moreover, in between steps other method steps may be inserted. The inserted steps may represent refinements of the method such as described herein, or may be unrelated to the method. Moreover, a given step may not have finished completely before a next step is started.

A method according to the invention may be executed using software, which comprises instructions for causing a processor system to perform the respective method. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 6A:
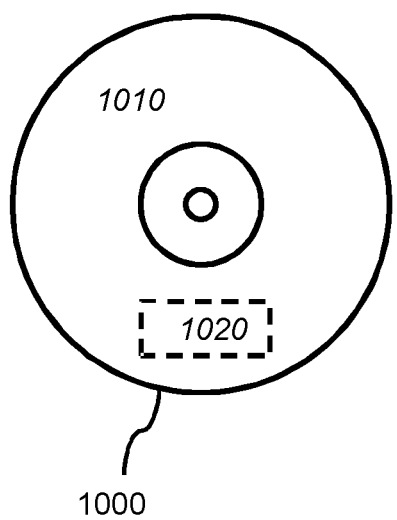
FIG. 6a shows a computer readable medium.

FIG. 6a shows a computer readable medium 1000 having a writable part 1010 comprising a computer program 1020, the computer program 1020 comprising instructions for causing a processor system to perform one or more of the above methods in the system as described with reference to FIGS. 1-5. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 6B:
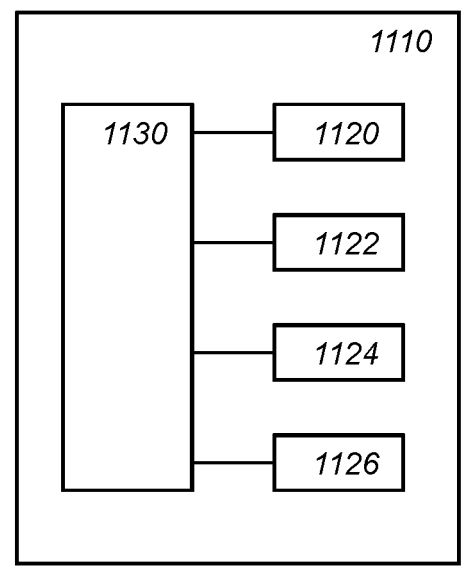
FIG. 6b shows in a schematic representation of a processor system.

FIG. 6b shows in a schematic representation of a processor system 1100 according to an embodiment of the device or server as described with reference to FIGS. 1-5. The processor system comprises one or more integrated circuits 1110. The architecture of the one or more integrated circuits 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

REFERENCE DOCUMENTS

[1] Wi-Fi Simple Configuration Technical Specification Version 2.0.5, Wi-Fi Alliance 2014-08-04; available from https://www.wi-fi.org/file/wi-fi-simple-configuration-technical-specification-v205

[2] IEEE Computer Society, "IEEE Standard for Information Technology—Telecommunications and Information Exchange Between Systems—local and Metropolitan Area Networks—Specific requirements Part 11: Wireless LAN Medium Access Control (MAC) and Physical Layer (PHY) Specifications," (IEEE Std. 802.11-2012), March 2012

[3] MPC190 Security Processor Hardware Reference Manual, available from: http://www.nxp.com/pages/security-processor:MPC190

The invention claimed is:

1. A communication device for secure wireless communication with a further communication device, the communication device comprising:
 a security processor and a wireless transceiver configured to establish secure interaction between the communication device and the further communication device according to a security protocol,
 the security protocol defining a link layer security according to a security mechanism,
 the communication device configured to act as a service seeker while the further communication device acts as a service provider or
 the communication device configured to act as a service provider while the further communication device acts as a service seeker, the security processor of the communication device acting
as service provider configured to
enable at least a first service, the first service requiring a
link layer security according to a first security mechanism;
establish a first secure link connection with the service
seeker on a link layer according to the first security
mechanism;
engage the first service via the first secure link connection;
the security processor of the communication device acting
as service seeker configured to
detect a first service as provided by the service provider;
establish the first secure link connection with the service
provider on a link layer according to the first security
mechanism;
engage the first service via the first secure link connection;
the security processor of the communication device acting
as service provider further configured to:
enable a further service;
determine that the further service requires a link layer
security according to a second security mechanism
different from the first security mechanism;
establish a second secure link connection with the service
seeker on the link layer according to the second security mechanism while the first secure link connection
remains active;
engage the further service via the second secure link
connection; and
block the service seeker from accessing the further service
until the second secure link connection has been established;
the security processor of the communication device acting
as service seeker further configured to:
detect that the further service requires a link layer security
according to a second security mechanism different
from the first security mechanism;
establish the second secure link connection with the
service provider on the link layer according to the
second security mechanism while the first secure link
connection remains active;
engage the further service via the second secure link
connection.

2. The device as claimed in claim 1, wherein
the first security mechanism comprises a first authentication protocol and the second security mechanism comprises a second authentication protocol different from
the first authentication protocol; or
the first security mechanism comprises a first set of
cryptographic operations and the second security
mechanism comprises a second set of cryptographic
operations different from the first set of cryptographic
operations.

3. The device as claimed in claim 1, wherein the secure
link connection on the link layer is an authenticated and
secure MAC transport layer connection using a first seeker
MAC address and a first provider MAC address, and the
security processor is configured to establish the second
secure link connection using a second seeker MAC address
and a second provider MAC address, the second seeker
MAC address being different from the first seeker MAC
address and the second provider MAC address being different from the first provider MAC address.

4. The device as claimed in claim 1, wherein the security
processor comprises a security management unit configured
to operate at a communication management layer above the
link layer and to determine that the further service requires
a link layer security according to the second security mechanism different from the first security mechanism by
determining a hierarchy or classification of different security mechanisms;
acquiring, from the link layer below the communication
management layer, first security data identifying the
security mechanism of the first secure link connections
establishing based on the first security data whether the
further service requires a different security mechanism.

5. The device as claimed in claim 1, wherein the security
processor comprises a link control unit configured to operate
at the link layer below a communication management layer
and to determine first security data identifying the security
mechanism of the first secure link connection, and to provide
the first security data upon request to the communication
management layer for enabling establishing whether the
further service requires a different security mechanism.

6. The device as claimed in claim 1, wherein the security
processor is configured, for determining that the further
service requires a link layer security according to a second
security mechanism different from the first security mechanism, to exchange a connection capability request message
with the further communication device, the connection capability exchange message indicating at least one supported
security mechanism.

7. The device as claimed in claim 1, wherein the security
processor of the communication device acting as service
provider is configured, for determining that the further
service requires a link layer security according to a second
security mechanism different from the first security mechanism,
to detect a session request message from the service
seeker indicative of a further service, wherein the
further service requires a link layer security according
to a second security mechanism different from the first
security mechanism; and
to send a session reject message to the service seeker
including an error code indicative of the further service
requiring a different link layer security; or
the security processor of the communication device acting
as service seeker is configured, for detecting that the
further service requires a link layer security according
to a second security mechanism different from the first
security mechanism;
to send a session request message to the service provider
indicative of a further service;
to receive a session reject message from the service
provider including an error code indicative of the
further service requiring a different link layer security.

8. The device as claimed in claim 1, wherein the security
processor is configured, for establishing the second secure
link connection while the first secure link connection
remains active as a Wi-Fi connection on a channel in a first
band, to establish a different Wi-Fi connection in a different
band or on a different channel in the first band.

9. The device as claimed in claim 1, wherein the security
processor is configured, subsequent to establishing the second secure link connection while the first secure link connection remains active,
to determine whether the first service allows a link layer
security of the second type using the second security
mechanism and, if so,
to route traffic from the first secure link connection to the
second secure link connection, and close the first secure
link connection.

10. The device as claimed in claim 1, wherein the security processor is configured for establishing a priority for the at least two services, and in dependence on the priority, establishing the second secure link connection via a selected communication channel and/or prioritize messages of the first and/or second service on the first and second secure link connection.

11. The device as claimed in claim 1, wherein the security processor of the communication device acting as service provider is configured, upon determining that the further service requires a link layer security according to a second security mechanism different from the first security mechanism, to send a security message to the service seeker that the further service requires a different link layer security;

or wherein the security processor of the communication device acting as service seeker is configured, for detecting that the further service requires a link layer security according to a second security mechanism different from the first security mechanism, to receive the security message from the service provider that the further service requires a different link layer security.

12. The device as claimed in claim 11, wherein the security processor of the communication device acting as service provider is configured to send the security message upon detecting that the service seeker tries to engage the further service through the first secure wireless connection.

13. A service seeker method for secure wireless communication between a communication device and a further communication device, the communication device comprising a security processor and a wireless transceiver configured to establish secure interaction between the communication device and the further communication device according to a security protocol, the security protocol defining a link layer security according to a security mechanism, the method when executing in the security processor having the communication device act as a service seeker, while the further communication device acts as a service provider, the service seeker method comprising detecting a first service as provided by the service provider, establishing a first secure link connection with the service provider on a link layer according to the first security mechanism, engaging the first service via the first secure link connection;

the service seeker method further comprising detecting that the further service requires a link layer security according to a second security mechanism different from the first security mechanism, establishing a second secure link connection with the service provider on the link layer according to the second security mechanism while the first secure link connection remains active, engaging the further service via the second secure link connection.

14. A service provider method for secure wireless communication between a communication device and a further communication device, the communication device comprising a security processor and a wireless transceiver configured to establish secure interaction between the communication device and the further communication device according to a security protocol, the security protocol defining a link layer security according to a security mechanism, the method when executing in the security processor having the communication device act as a service provider, while the further communication device acts as a service seeker, the service provider method comprising:

enabling at least a first service, the first service requiring a link layer security according to a first security mechanism;

establishing a first secure link connection with the service seeker on a link layer according to the first security mechanism;

engaging the first service via the first secure link connection;

enabling a further service;

determining that the further service requires a link layer security according to a second security mechanism different from the first security mechanism;

establishing a second secure link connection with the service seeker on the link layer according to the second security mechanism while the first secure link connection remains active;

engaging the further service via the second secure link connection; and blocking the service seeker from accessing the further service until the second secure link connection has been established.

15. A non-transitory computer-readable medium having one or more executable instructions stored thereon, which when executed by a processor, cause the processor to perform a method for secure wireless communication between a communication device and a further communication device, the communication device comprising a security processor and a wireless transceiver configured to establish secure interaction between the communication device and the further communication device according to a security protocol, the security protocol defining a link layer security according to a security mechanism, the method when executing in the security processor having the communication device act as a service provider, while the further communication device acts as a service seeker, the method comprising:

enabling at least a first service, the first service requiring a link layer security according to a first security mechanism;

establishing a first secure link connection with the service seeker on a link layer according to the first security mechanism;

engaging the first service via the first secure link connection;

enabling a further service;

determining that the further service requires a link layer security according to a second security mechanism different from the first security mechanism;

establishing a second secure link connection with the service seeker on the link layer according to the second security mechanism while the first secure link connection remains active;

engaging the further service via the second secure link connection; and blocking the service seeker from accessing the further service until the second secure link connection has been established.

* * * * *